United States Patent
Folkner et al.

(10) Patent No.: US 10,677,676 B2
(45) Date of Patent: Jun. 9, 2020

(54) NON-CONTACT MAGNETOSTRICTIVE SENSOR ALIGNMENT

(71) Applicant: Bently Nevada, LLC, Minden, NV (US)

(72) Inventors: David Folkner, Greenville, SC (US); Dan Tho Lu, Minden, NV (US); Lysle Turnbeaugh, Minden, NV (US); Brian F. Howard, Minden, NV (US); Trevor Cowan, Minden, NV (US); Brian Bowlds, Minden, NV (US); David O'Connor, Minden, NV (US)

(73) Assignee: Bently Nevada, LLC, Minden, NV (US)

( * ) Notice: Subject to any disclaimer, the term of this patent is extended or adjusted under 35 U.S.C. 154(b) by 111 days.

(21) Appl. No.: 15/696,745

(22) Filed: Sep. 6, 2017

(65) Prior Publication Data

US 2019/0072449 A1 Mar. 7, 2019

(51) Int. Cl.
*G01L 25/00* (2006.01)
*G01L 1/12* (2006.01)

(52) U.S. Cl.
CPC .............. *G01L 25/00* (2013.01); *G01L 1/125* (2013.01)

(58) Field of Classification Search
CPC .................................. G01L 25/00; G01L 1/125
See application file for complete search history.

(56) References Cited

U.S. PATENT DOCUMENTS

| 9,217,682 | B2 | 12/2015 | Brummel et al. |
| 2014/0366637 | A1 | 12/2014 | Brummel et al. |
| 2015/0002169 | A1* | 1/2015 | Lu ............. G01R 35/005 324/601 |
| 2015/0292962 | A1* | 10/2015 | Lu ............. G01L 1/125 73/862.69 |
| 2018/0164396 | A1* | 6/2018 | Folkner ...... G01R 35/005 |

* cited by examiner

*Primary Examiner* — Xin Y Zhong
(74) *Attorney, Agent, or Firm* — Mintz Levin Cohn Ferris Glovsky and Popeo, P.C.

(57) ABSTRACT

Systems, methods, and devices for positioning, orienting, and/or aligning a stress sensor assembly are provided. Raw stress signals, which can correspond to stress in the target, can be generated by detecting a magnetic flux that travels through the target. The raw stress signals can be sensitive to an alignment of the sensor relative to the target. In order to minimize measurement error, the stress sensor can be properly aligned relative to the target prior to taking a stress measurement. Sensor alignment can involve adjusting a yaw, pitch, and/or roll of the sensor, measuring the raw stress signals, attenuating the detected magnetic flux, and measuring the raw stress signals again. When the stress sensor is properly aligned, a change in a size of a gap between the sensor and a surface of a target can result in approximately equal changes in the raw stress signal.

28 Claims, 12 Drawing Sheets

NON-CONTACT MAGNETOSTRICTIVE SENSOR ALIGNMENT

BACKGROUND

Sensor alignment systems and methods are provided, and in particular systems and methods are provided for aligning a magnetostrictive sensor.

Ferromagnetic materials can have magnetostrictive properties that can cause the materials to change shape in the presence of an applied magnetic field. The inverse can also be true. When a stress is applied to a conductive material, magnetic properties of the material, such as magnetic permeability, can change. A magnetostrictive sensor is a non-contact sensor that can include sensing elements configured to sense the changes in magnetic permeability and, because the changes can be proportional to the amount of stresses applied to the conductive material, the resulting measurement can be used to calculate the amount of stress.

The changes in the magnetic permeability arising from an application of stress to the conductive material can be small. To facilitate measurement of small magnetic permeability changes, measurement errors due to a gap distance between the sensing elements of the magnetostrictive sensor and the target can be accounted for when calculating the stress applied to the target. As an example, magnetostrictive sensors can be manually aligned with the target and the gap distance can be set by a gauge. However, such manual align can result in different gaps between the target and each sensing element and it can fail to properly compensate for the gap distance.

SUMMARY

Systems, devices, and methods for aligning a stress sensor relative to a target are provided. In one aspect, a sensor assembly is provided that includes a sensor and an attenuation element. The sensor can include a drive element that can be configured to generate a first magnetic field and a corresponding first magnetic flux. The first magnetic flux can travel through a first gap distance between the drive element and a surface of a target, and through the target. The sensor can also include at least one detection element that can be configured to detect a portion of the first magnetic flux. The attenuation element can be configured to allow the detected portion of the first magnetic flux to be selectively adjusted without axially translating the sensor relative to the target.

The sensor assembly can vary in a number of ways. For example, a position of the attenuation element can adjustable relative to the sensor such that varying the position of the attenuation element can vary the detected portion of the first magnetic flux. As another example, the attenuation element can be a sleeve disposed about the sensor, and the sensor assembly can be configured to increase an amount of attenuation as the attenuation element is moved toward the target. As yet another example, the attenuation element can be a plate disposed between the sensor and the target.

In one implementation, the attenuation element can be disposed about at least a portion of the sensor. The attenuation element can include at least one conductive element that can be configured to generate a second magnetic field that can interact with a portion of the first magnetic field, thereby adjusting a magnitude of the detected portion of the first magnetic flux. In certain aspects the second magnetic field can be generated by an alternating current that flows through the at least one conductive element. The second magnetic field can attenuate a portion of the first magnetic field, thereby attenuating the detected portion of the first magnetic flux. In some embodiments, the at least one conductive element of the attenuation element can be configured to couple with the first magnetic field. The sensor assembly can also include a resistor that can be coupled in parallel with the conductive element. A resistance of the resistor can be variable such that adjusting the resistance of the resistor can adjust a magnitude of the second magnetic field, thereby adjusting the magnitude of the detected portion of the first magnetic flux. Additionally, the attenuation element can be configured to increasingly attenuate the detected portion of the first magnetic flux as resistance of the resistor is decreased.

In some embodiments, the at least one conductive element of the attenuation element can be configured to receive a selectively adjustable alternating current attenuation signal to generate the alternating current that flows through the at least one conductive element. The attenuation element can be configured to attenuate the detected portion of the first magnetic flux when a phase of the second magnetic field is out of phase with a phase of the first magnetic field. The attenuation element can be configured to amplify the detected portion of the first magnetic flux when a phase of the second magnetic field is in phase with a phase of the first magnetic field.

In some implementations, the drive element can be configured to receive an input drive signal to generate the first magnetic flux. The attenuation element can be configured to receive a raw input drive signal and use the raw input drive signal to generate the input drive signal that can be received by the drive element. The attenuation element can include a resistor. The resistor can configured to control a magnitude of the input drive signal, thereby controlling a magnitude of the first magnetic flux. A resistance of the resistor can be configured to be adjustable such that increasing the resistance of the resistor decreases the magnitude of the input drive signal, thereby decreasing the magnitude of the first magnetic flux and decreasing a magnitude of the detected portion of the first magnetic flux.

In other implementations, the sensor assembly can further include at least one LED indicator that can be configured to output a signal regarding an alignment of the sensor relative to a desired alignment of the sensor. The at least one LED indicator can include first, second and third LED indicators corresponding to yaw, pitch, and roll values of a position of the sensor. As one example, the first, second, and third LED indicators can be configured to output light that changes in brightness as yaw, pitch, and roll are adjusted toward a desired values. As another example, the first second and third LED indicators can be configured to output light that changes in color as yaw, pitch, and roll are adjusted toward desired values. As yet another example, the first, second, and third LED indicators can be configured to blink with varying frequency as yaw, pitch, and roll are adjusted toward desired values.

In another aspect, a method of aligning a sensor assembly is provided. The method can include activating a control and processing module to deliver an input drive signal to a drive element of a sensor of a sensor assembly, thereby generating a first magnetic field having a corresponding first magnetic flux that travels through a target. At least one detection element can detect a portion of the first magnetic flux. The method can further include adjusting the detected portion of the first magnetic flux, and rotating the sensor about at least one of a first axis to adjust a yaw of the sensor relative the target, a second axis to adjust a pitch of the sensor, and a third axis to adjust a roll of the sensor.

The method can vary in a number of ways. For example, the method can include adjusting a position of an attenuation element to attenuate the detected portion of the first magnetic flux. Moving the attenuation element toward the target can adjust the attenuation of the detected portion of the magnetic flux.

In one implementation, the method can include coupling the first magnetic field with a conductive element of an attenuation element, thereby inducing an alternating current that can flow through the conductive element such that the conductive element can generate a second magnetic field. The second magnetic field can attenuate the first magnetic field, thereby adjusting the detected portion of the first magnetic flux by attenuating the detected portion of the first magnetic flux. Adjusting a resistance of a resistor coupled to the conductive element can adjust an amount of attenuation of the detected portion of the first magnetic flux.

In another implementation, the method can include delivering a selectively adjustable alternating current attenuation signal to a conductive element of an attenuation element, thereby generating an alternating current that flows through the conductive element such that the conductive element generates a second magnetic field. An amplitude, phase, and frequency of the selectively adjustable alternating current attenuation signal can define an amplitude, phase, and frequency of the second magnetic field. The method can further include adjusting the amplitude of the alternating current attenuation signal, thereby adjusting the amplitude of the second magnetic field. The detected portion of the first magnetic flux can adjusted by attenuating the detected portion of the first magnetic flux when the phase of the second magnetic field is out of phase with a phase of the first magnetic field.

As another example, the method can include delivering a raw input drive signal to an attenuation element to generate the input drive signal. The method can further include adjusting a resistance of a resistor of the attenuation element to adjust a magnitude of the input drive signal, thereby adjusting a magnitude of the first magnetic flux and a magnitude of the detected portion of the first magnetic flux.

In some implementations, the yaw, pitch, and roll of the sensor can be adjusted based on an output from at least one LED indicator on the sensor assembly. The output can be a light intensity from the at least one LED indicator. The output can be a color of light from the at least one LED indicator. The output can be a blinking frequency of light from the at least one LED indicator.

DETAILED DESCRIPTION

Figure 1A:
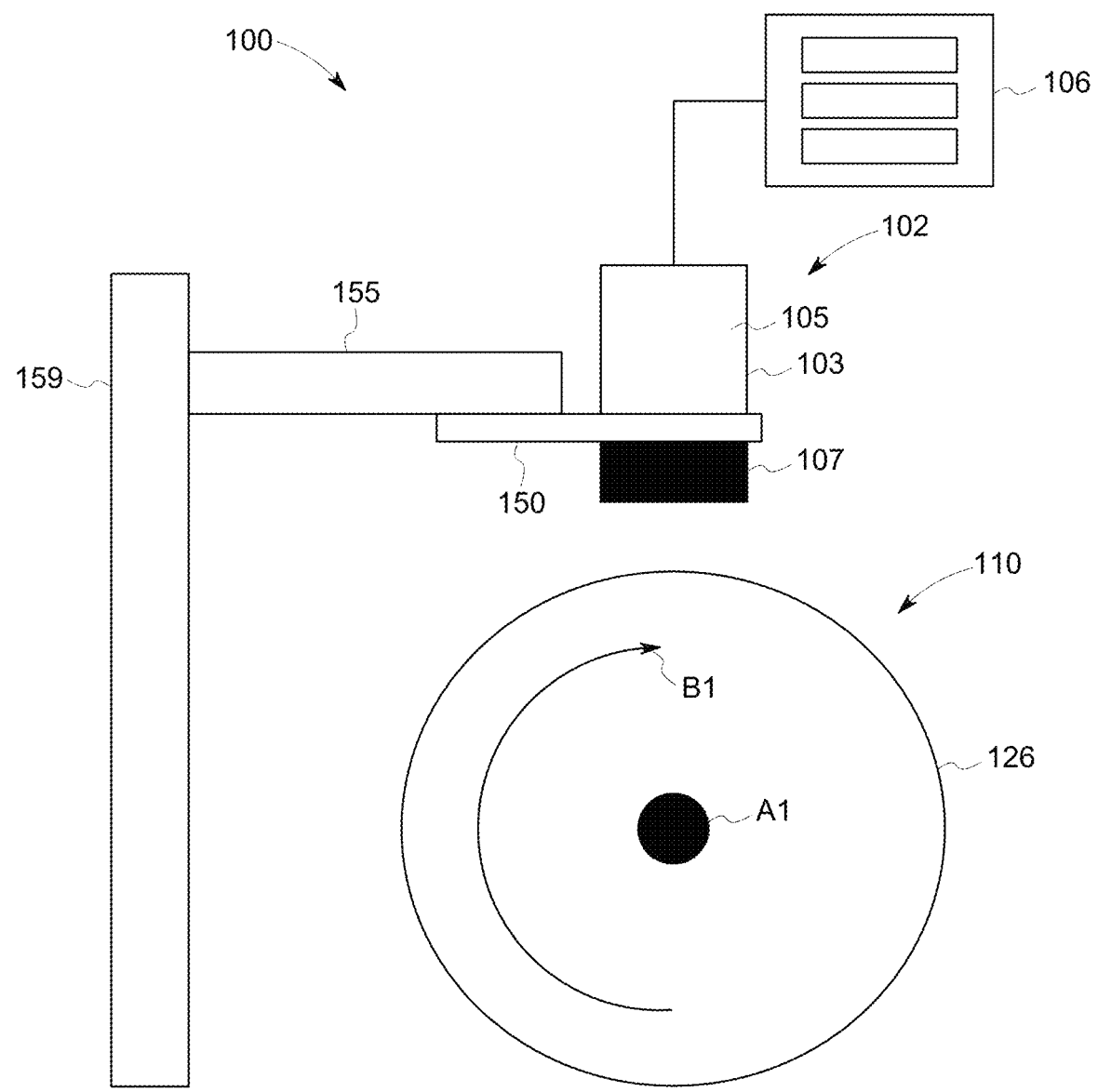
FIG. 1A is a side view of one embodiment of a sensor system.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Systems, methods, and devices are provided for positioning, orienting, and/or aligning a stress sensor relative to a structure to be tested. It can be desirable to monitor certain components, such as a shaft of a turbine, to ensure that it is functioning within an appropriate operating range. One way to monitor such components is to use a stress sensor to sense stress within the material. The stress sensor can generate a magnetic flux that can travel through the component, and can be detected by detection elements of the stress sensor. Magnetic flux is a measurement of the total magnetic field which passes through a given area. It is a useful tool for helping describe the effects of the magnetic field on something occupying a given area. For example, when a stress is applied to a conductive material, a magnetic flux that travels through the material can be affected. The magnetic flux can travel through the detection elements, such that it can be detected. The detection elements can generate raw stress signals corresponding a magnitude of detected magnetic flux. The raw stress signals can be signals such as, e.g., a current and/or a voltage, that are generated by the detection elements as a result of the detected magnetic flux. In order to minimize measurement error, the stress sensor can be aligned relative to the component prior to taking a stress measurement. For example, when the stress sensor is properly aligned, a change in a size of a gap between the sensor and a surface of a target can result in approximately equal changes in raw stress signals output from a number detection elements that the stress sensor can have, where the raw stress signals can correspond to values of stress in the target. If the size of the gap changes, raw stress signals from each of the number detection element can change by significantly different amounts, which can result an inaccurate stress measurements. Thus, the raw stress signals output by the detection elements can be used for alignment of the stress sensor.

In some cases, aligning the stress sensor can involve varying the size of the gap between the sensor and the target, and adjusting a yaw, pitch, and/or a roll of the sensor until changes in a size of the gap between the sensor and a surface of a target result in approximately equal changes in raw stress signals. A more detailed description of such an alignment procedure can be found in U.S. patent application Ser. No. 15/378,503, entitled "Non-Contact Magnetostrictive Sensor Alignment Methods and Systems", filed on Dec. 14, 2016, which is hereby incorporated by reference in its entirety. However, such alignment can require fine adjustments of the size of the gap between the stress sensor and the target, which can be difficult to achieve.

Accordingly, systems and methods are provided for aligning a stress sensor without the need for adjusting the size of the gap between the stress sensor and the target. In some embodiments, this can be accomplished by attenuating a detected magnetic flux that generates the raw stress signals. Attenuating the detected magnetic flux can simulate adjusting the size of the gap between the sensor and the target. Therefore, the sensor can be aligned relative to the target by adjusting yaw, pitch, and/or roll of the sensor without any substantial axial translation of the sensor relative to the target to adjust the size of the gap between the sensor and the target.

FIG. 1A illustrates an exemplary embodiment of a sensor system 100 that can be used to detect stress, such as torque, bending, and/or axial loading, applied to a target. In general, the sensor system 100 can include a sensor 102 which can be received within a sensor mounting assembly 150 or mounting bracket, and positioned proximate to a surface 126 of a target 110 such as, e.g., a rotatable shaft, to be tested. As an example, the target 110 can rotate about axis A1, as indicated by arrow B1. The sensor mounting assembly 150 can facilitate adjusting and/or maintaining the position of the sensor 102 relative to the target 110. As illustrated in FIG. 1A, the mounting bracket 150 can be coupled to an extension arm 155, which can be coupled to a rigid support 159. The mounting assembly 150 can facilitate proper alignment of the sensor 102 relative to the target 110, and it can maintain proper orientation and alignment of the sensor 102 with regard to the target 110. The sensor 102 can send and receive signals to and from a control and processing module 106 for conducting measurements. The signals can be, e.g., voltage and/or current signals. Embodiments of the sensor 102 are described in more detail in U.S. application Ser. No. 15/598,062, entitled "Non-Contact Magnetostrictive Sensor with Gap Compensation Field," filed on May 17, 2017, which is incorporated by reference herein in its entirety.

As shown in FIG. 1A, the sensor 102 can include a housing 103 having a proximal portion 105 and a distal portion 107. In some embodiments, the proximal portion 105 can be made out of, e.g., stainless steel, aluminum, or another metal, and the distal portion 107 can be made out of a non-conductive material such as, e.g., a ceramic or a moldable, machinable, polymer. The sensor 102 can include a sensor head disposed within the housing 103. The sensor head can include a drive element and at least one detection element that can be disposed within the distal portion 107 of the housing 103.

Figure 1B:
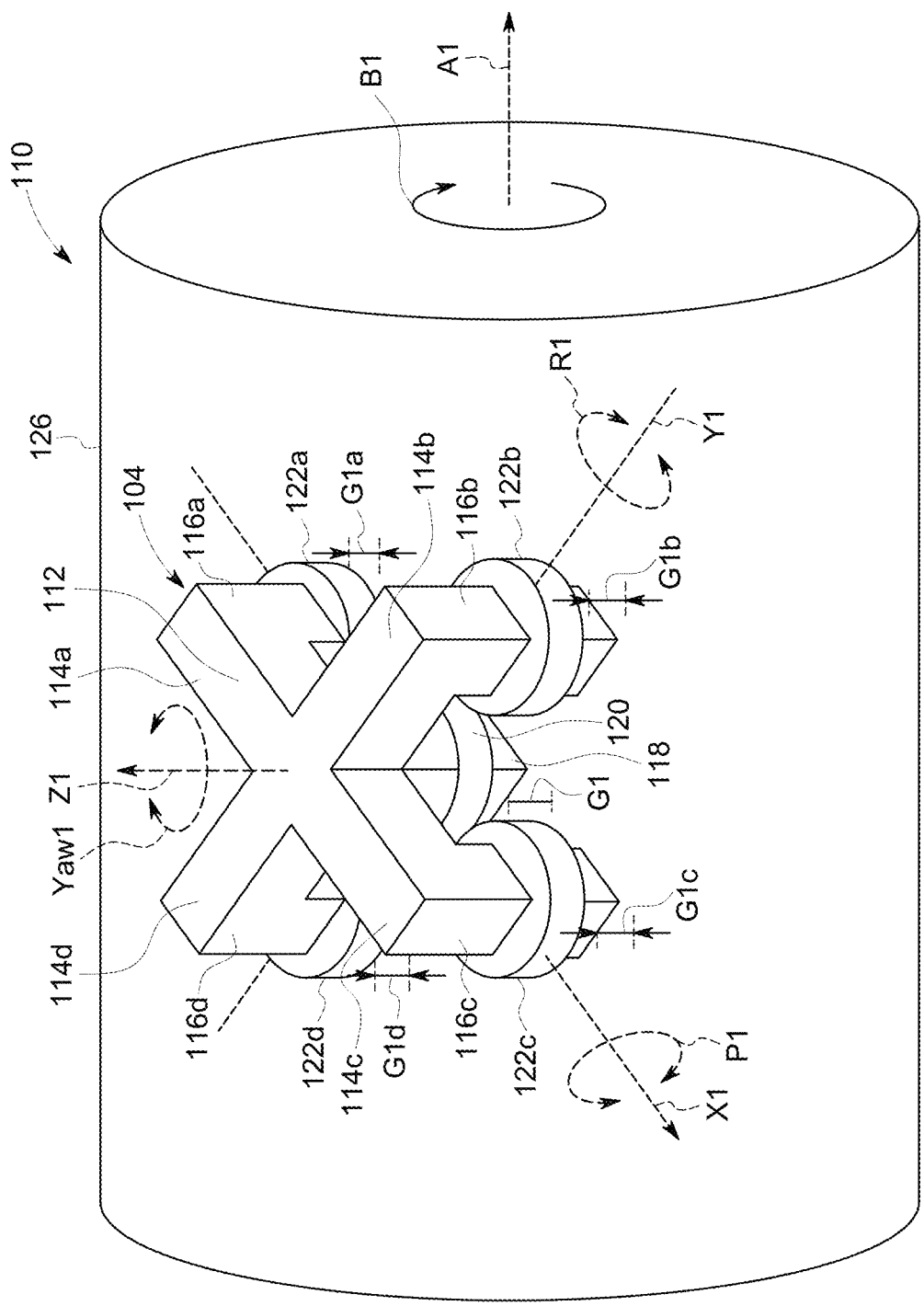
FIG. 1B is a perspective view of one embodiment of a sensor head of the sensor system of FIG. 1A.

FIG. 1B shows an embodiment of a sensor head 104. The sensor head 104 can include a support 112 with four support bars 114a, 114b, 114c, 114d that each extend outward therefrom (e.g., along a axes X1, Y1). The support bars 114a, 114b, 114c, 114d can have detection arms 116a, 116b, 116c, 116d that extend distally therefrom toward the target 110 (e.g., in the direction of axis Z1. The support 112 can also include a central arm 118 that extends distally toward the target 110 along the central axis Z1.

As shown in FIG. 1B, the sensor head 104 can be positioned above the surface 126 of the target 110, with a gap G1 between a distal end of the central arm 118 and the surface 126 of the target 110. Similarly, each of the detection arms 116a, 116b, 116c, 116d can have corresponding gaps G1a, G1b, G1c, G1d between their distal ends and the surface 126 of the target 110, in the direction parallel to the Z1 axis. In some embodiments, the number of support bars and/or detection arms may be four, as illustrated, or greater than or fewer than four.

As illustrated in FIG. 1B, a first pair of detection elements 122a, 122c can extend along and define the axis X1, and a second pair of detection elements 122d, 122b can extend along and define the axis Y1, which can extend orthogonal to the axis X1. A pitch and roll of the sensor head 104 can be adjusted independently by rotating the sensor head 104 about the axes X1, Y1, as indicated by arrows P1, R1. A yaw of the sensor head 104 can be adjusted by rotating the sensor head 104 about axis Z1, as indicated by Yaw1.

The sensor head 104 can further include the drive subsystem having a drive element 120 located on the central arm 118 of the support 112. The drive element 120 and detection elements 122a, 122b, 122c, 122d can each be made of an electrical conductor (e.g., copper wire). For example, one or more segments of copper wire can be wound around the arms 118, 116a, 116b, of the support 112 to create the drive element 120 and detection elements 122a, 122b, 122c, 122d. The drive element 120 can receive an input drive signal from the control and processing module 106 to generate a magnetic flux, corresponding to a magnetic field. The input drive signal can be, e.g., an alternating current (AC) signal. The alternating current corresponding to the input drive signal can flow through the drive element 120. The flow of current through the drive element 120 can generate the magnetic field, and the corresponding magnetic flux. The magnetic flux can travel from the drive element 120 through the target 110, and it can be detected by the first and second pair of detection elements. The detection elements 122a, 122b, 122c, 122d can then generate raw stress signals based on the detected magnetic flux. The raw stress signals can be delivered to the control and processing module 106, and can be used to determine values of stress within the target 110. The raw stress signals can be current signals or voltage signals. Both amplitude and phase of the voltage, and/or current, signals can be measured. Additional details regarding the drive subsystem and drive element 120 can be found in U.S. application Ser. No. 15/598,062.

Although changes in the detected magnetic flux can correspond to changes in the stress state of the target 110, the detected magnetic flux can also be sensitive to the position and orientation of the sensor head 104 relative to the surface 126 of the target 110. As one example, the raw stress signals, corresponding to the detected magnetic flux, can be a function of a stress state of the target 110 as well as the size of gap G1. For example, as the size of the gap G1 increases, the amount of the magnitude of the magnetic flux detected by the detection elements 122a, 122b, 122c, 122d can decrease. Accordingly, in some embodiments, a proximity sensor element can be used to determine the size of gap G1 so that the raw stress signals can be corrected based on the size of the gap G1, and a corrected stress signal can be determined.

The values of the raw stress signals can also be sensitive to the alignment and positioning of the sensor 102, and/or sensor head 104, relative to the target 110. The raw stress signals can vary with a size of gaps G1a, G1b, G1c, G1d between distal ends of detection arms 116a, 116b, 116c, 116d and the surface 126 of the target 110. As an example, for a given gap G1, the gaps G1a, G1b, G1c, G1d can have different sizes. In one embodiment, as the size of gap G1a is increased, the value of the raw stress signal from the detection element 122a can decrease. Therefore, it can be beneficial to align the sensor 102, and/or the sensor head 104, relative to the target 110.

During normal operation, the sensor 102 and/or the target 110 can experience perturbations which can cause the size of gap G1 to vary. When the sensor 102 is properly aligned, a change in a size of the gap G1 can result in approximately equal changes in raw stress signals output from the number detection elements 122a, 122b, 122c, 122d. Approximately equal changes in raw stress signals can allow each of the raw stress signals to be corrected in the same manner to compensate for a change in the size of the gap G1. Accordingly, proper sensor alignment can compensate for manufacturing inconsistencies that can result in varied values of magnetic flux being detected by each of the detection elements 122a, 122b, 122c, 122d, correct for user variability in placement of the sensor 102 relative to the target 110, and can allow the raw stress signals to be corrected uniformly for changes in the size of the gap G1. Prior art techniques align the stress sensor 102 by varying the size of gap G1 and adjusting a yaw, pitch, and roll of the sensor 102 until changes in a size of the gap G1 result in approximately equal changes in raw stress signals from the detection elements 122a, 122b, 122c, 122d.

In some cases, the sensor 102 can be aligned using a mounting bracket, such as mounting bracket 150. However, using a bracket to align the sensor 102 can require that the bracket precisely adjust the size of the gap G1 between the sensor 102 and the target 110. Accordingly, the sensor 102 may be aligned without adjusting the size of the gap G1 between the stress sensor 102 and the target 110. As discussed in greater detail below, rather than physically adjusting the size of the gap G1 during a sensor alignment procedure, the magnetic flux detected by the detection elements 122a, 122b, 122c, 122d can be attenuated, thereby simulating an adjustment in the size of the gap G1. Therefore, the sensor 102 can be rotated relative to the target 110 to adjust, yaw, pitch, and roll of the sensor 102, without substantial translation of the sensor 102 relative to the target 110. Accordingly, the size of gap G1 can remain substantially unchanged during alignment. In some embodiments, only yaw, pitch and roll of the sensor 102 are adjusted.

Moveable Attenuation Elements

Figure 2A:
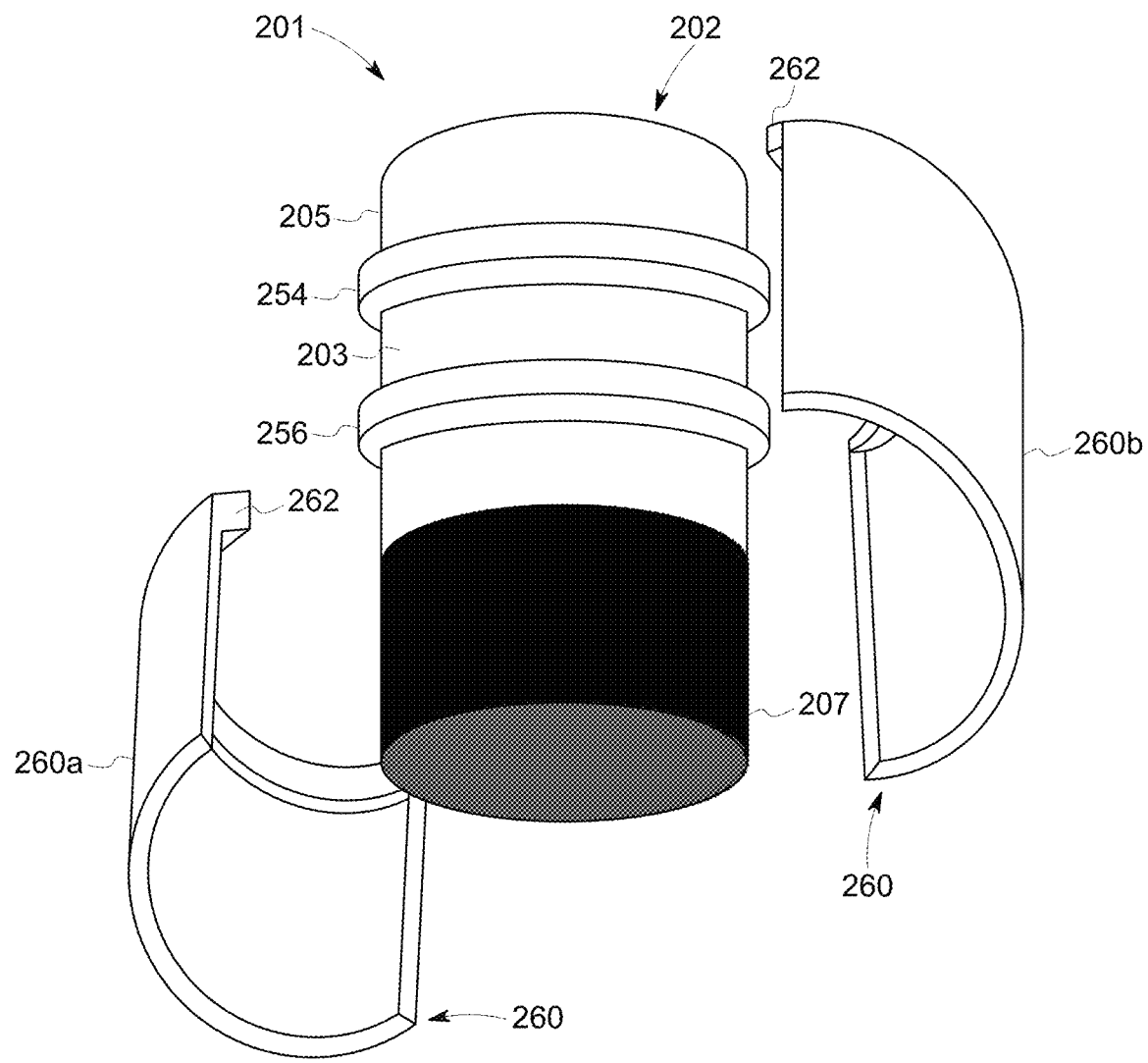
FIG. 2A is a bottom perspective view of one exemplary embodiment of a sensor assembly that includes the sensor head of FIG. 1B and an attenuation element.
Figure 2B:
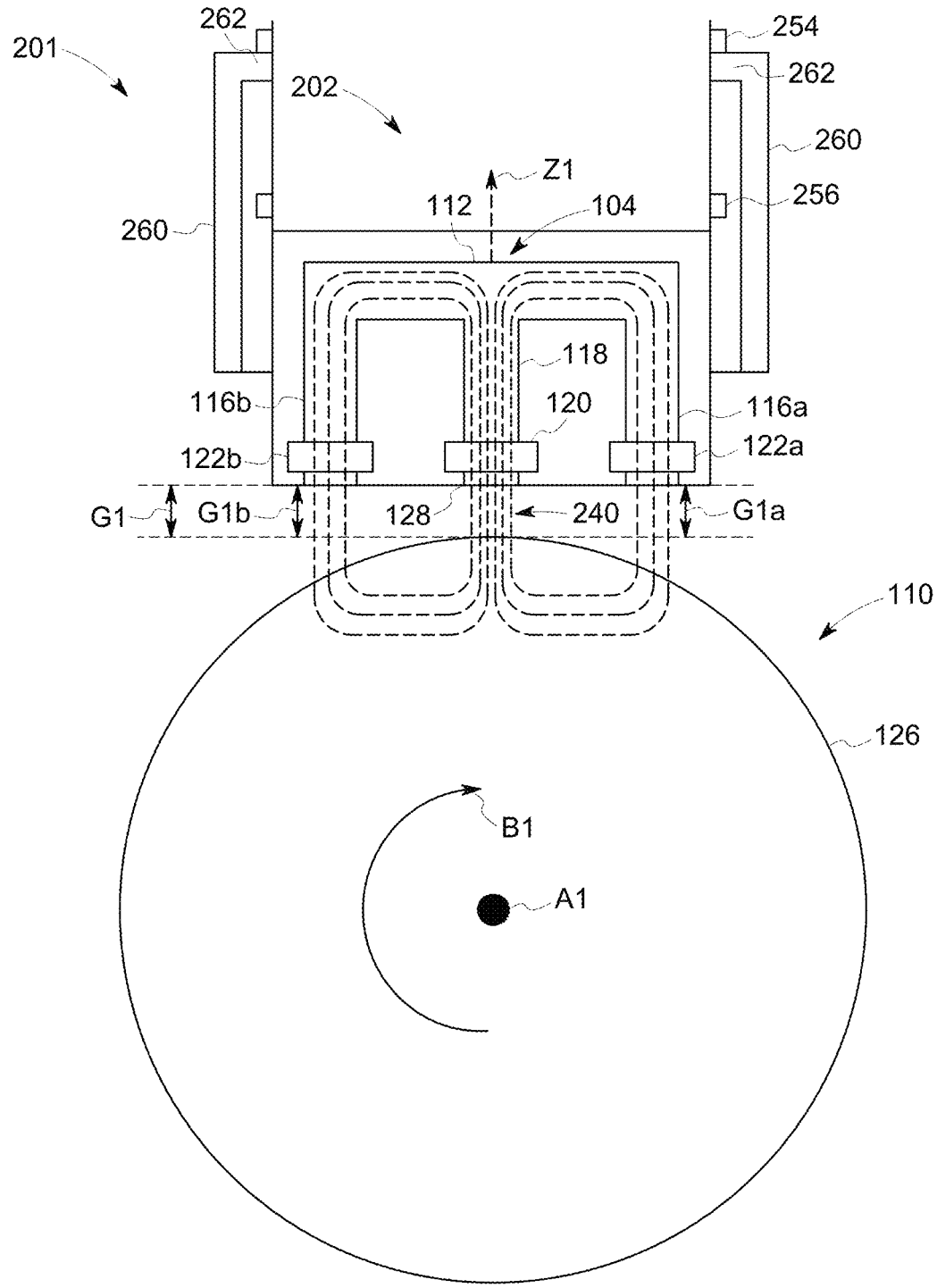
FIG. 2B is a side partial cross-sectional view of the sensor assembly of FIG. 2A, with the attenuation element in a proximal-most position.
Figure 2C:
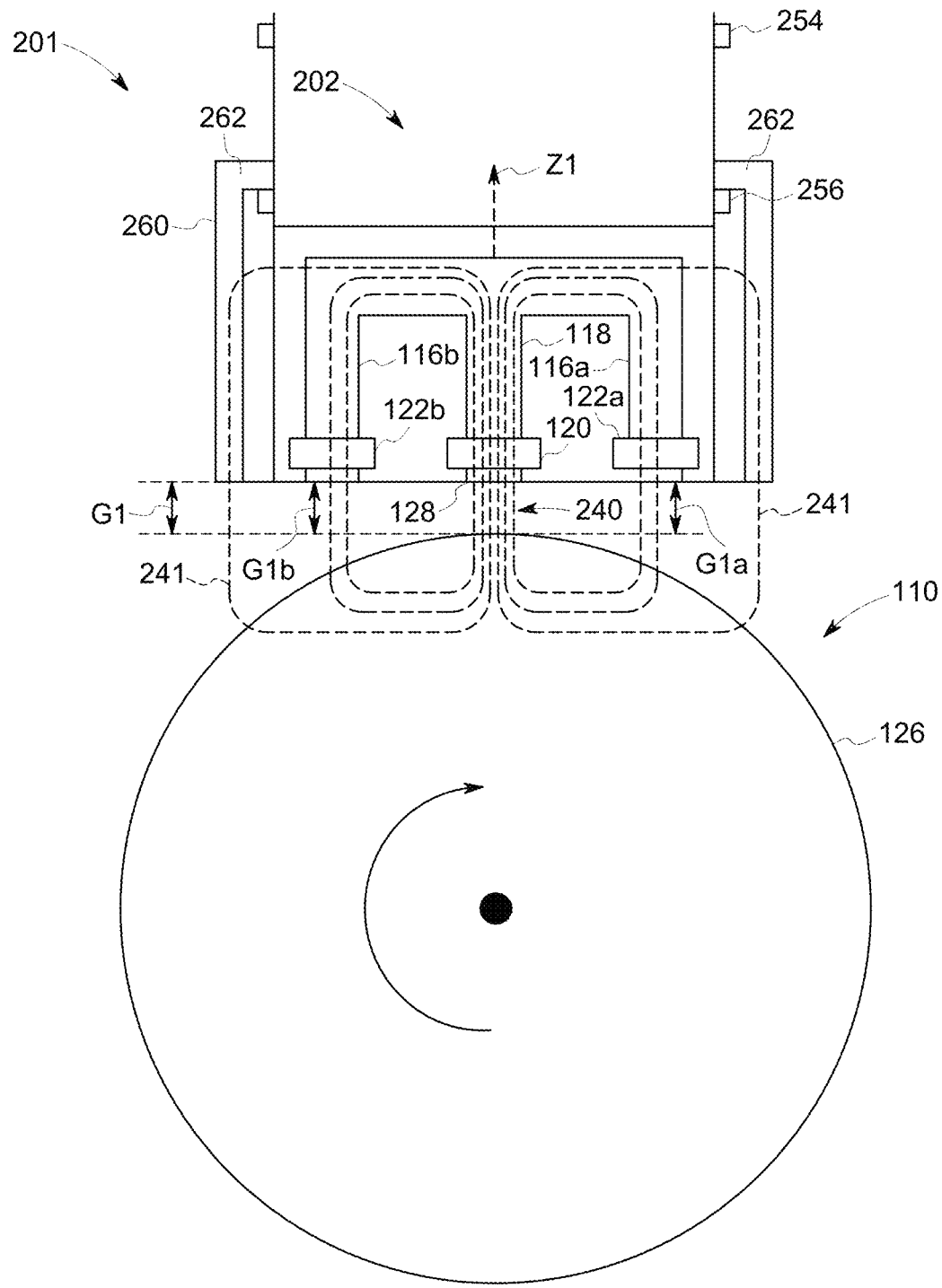
FIG. 2C is a side partial cross-sectional view of the sensor assembly of FIG. 2B, with the attenuation element in a distal-most position.

FIGS. 2A-2C show an embodiment of a sensor assembly 201 that is configured to selectively attenuate a magnetic flux detected by detection elements using a mechanically adjustable attenuation element. The sensor assembly 201 can be used within a sensor system, such as sensor system 100, and it can include a sensor 202 that can generally be similar to sensor 102, as well as one or more attenuation elements 260 that can facilitate proper alignment of the sensor head 104 relative to the target 110. As shown, the attenuation element 260 can be in the form of a cylindrical sleeve, and it can include a first part 260a and a second part 260b. Each part 260a, 260b of the attenuation element 260 can include a rim 262 that extends radially inward such that the rim 262 can be positioned between proximal and distal stopping elements 254, 256 that can be disposed about a proximal portion 205 of a housing 203 of the sensor 202. The proximal and distal stopping elements 254, 256 can impose proximal and distal limits to motion of the attenuation element 260. In some embodiments, the proximal and distal stopping elements 254, 256 can be disposed about a distal portion 207 of the housing 203. The attenuation element 260 can be made of materials possessing high magnetic permeability. Examples of such materials can include, without limitation, ferrous materials (e.g., iron, steel), silicon, nickel, cobalt, etc.

The sensor 202 can include the sensor head 104. The sensor 202, and therefore the sensor head 104, can be positioned above the surface 126 of the target 110, with a gap G1 between the distal end 128 of the central arm 118 and the surface 126 of the target 110. As an example, the sensor assembly 201 can be initially positioned within a bracket (e.g., bracket 150) and it can be mechanically aligned (e.g., using a V-block) to achieve an initial alignment between the sensor assembly 201 and the target 110. As described above, the drive element 120 can receive an input drive signal from a control and processing module, such as the control and processing module 106, to generate a magnetic flux 240, shown in FIGS. 2B-2C, corresponding to a magnetic field.

As shown in FIG. 2B, the magnetic flux 240 can travel from the drive element 120 through the target 110, and it can be detected by the detection elements 122a, 122b, 122c, 122d, which can generate raw stress signals based on the detected magnetic flux. The alignment procedure can involve adjusting yaw, pitch, and roll of the sensor such that changes in the size of gap G1 between the sensor result in approximately equal changes in raw stress signals output from the detection elements 122a, 122b, 122c, 122d.

As the attenuation element 260 is moved distally (FIG. 2C), the magnetic field corresponding to the magnetic flux 240 can begin to couple with the attenuation element 260. Accordingly, the coupling can create a flow path or preferential flow path for a portion 241 of the magnetic flux 240, thereby reducing the amount of the magnetic flux 240 detected by the detection elements 122a, 122b, 122c, 122d, and reducing the corresponding raw stress signals that can be generated. Depending on the position of the attenuation element 260, the amount of attenuation can vary. That is, the magnitude of the portion 241 of the magnetic flux 240, relative to the total magnetic flux 240, can vary. Therefore, the attenuation element 260 can be configured to allow a detected portion of the magnetic flux 240 to be selectively adjusted without axially translating the sensor 202 relative to the target 110. As an example, when the attenuation element 260 is in a proximal-most position, where the rim 262 of the attenuation element 260 can abut the proximal stopping element 254, as shown in FIG. 2B, the magnetic flux 240 detected by the detection elements 122a, 122b, 122c, 122d can be attenuated very little, or not at all. When the attenuation element 260 is in a distal-most position, where the rim 262 of the attenuation element 260 can abut the distal stopping element 256, as shown in FIG. 2C, the magnetic flux detected by the detection elements 122a, 122b, 122c, 122d can be significantly attenuated. Accordingly, as the attenuation element 260 is moved distally, the amount of attenuation can increase as a result of increased coupling between the magnetic field and the attenuation element 260, thereby simulating an increasing size of gap G1.

The yaw of the sensor assembly 201, and therefore the sensor head 104, can be adjusted to reduce differences in the raw stress signals from the first pair of detection elements 122a, 122c and the second pair of detection elements 122b, 122d, as a function of an amount of attenuation. As an example, the attenuation element 260 can be placed in a selected position from the proximal-most position to the distal-most position, followed by adjustment of the yaw, and measurement of the raw stress signals. Subsequently, the attenuation element 260 can be moved distally and/or proximally to adjust the amount of attenuation, and the raw stress signals can be measured again. The process can be repeated until differences in the raw stress signals from the first pair of detection elements 122a, 122c and the second pair of detection elements 122b, 122d, as a function of attenuation, have been reduced by a desired amount (e.g., below a threshold difference). In some embodiments, the yaw of the sensor assembly 201 can be adjusted by rotating the sensor assembly 201 within a retaining element of the bracket 150.

The pitch and roll of the sensor assembly 201 can be adjusted such that differences in the raw stress signals from the detection elements 122a, 122b, 122c, 122d, as a function of the amount of attenuation, can be further reduced. The pitch and roll of the sensor assembly 201 can be adjusted independently by rotating the sensor assembly about axes X1, Y1 (e.g., arrows P1, R1, shown in FIG. 1B).

The bracket 150 can allow the user to adjust the pitch of the sensor assembly 201 while keeping roll of the sensor assembly unchanged or substantially unchanged, and vice versa. Adjusting the pitch of the sensor assembly 201 can change the relative sizes of gaps G1b, G1d. For example, by increasing the size of gap G1b, the gap G1d can decrease by a corresponding amount while keeping G1a and G1c nominally unchanged. Therefore, detection element 122b can be moved in the proximal direction away from the surface 126 of the target 110, and detection element 122d can be moved in the distal direction toward the surface 126 of the target 110. In another instance, the size of gap G1b can be decreased, and the size of gap G1d can be increase by a corresponding amount. Therefore, detection element 122b can be moved in the distal direction toward the surface 126 of the target 110, and detection element 122d can be moved in the proximal direction away from the surface 126 of the target 110. In general, the pitch can be adjusted, the raw stress signals can be measured, the attenuation element 260 can be moved distally and/or proximally to adjust the amount of attenuation, and the raw stress signals can be measured again. The process can be repeated until differences in the raw stress signals from the first pair of detection elements 122a, 122c and the second pair of detection elements 122b, 122d, as a function of attenuation, have been reduced as much as possible, or by a desired amount.

Similarly, the roll of the sensor assembly can be adjusted. Adjusting the roll of the sensor assembly can change the relative sizes of gaps G1a, G1c. For example, by increasing the size of gap G1a, the size of gap G1c can decrease by a corresponding amount. Therefore, detection element 122a can be moved in the proximal direction away from the surface 126 of the target 110, and detection element 122c can be moved in the distal direction toward the surface 126 of the target 110. In another instance, the size of gap G1a can be decreased, and the size of gap G1c can be increase by a corresponding amount while keeping G1b and G1d nominally unchanged. Therefore, detection element 122a can be moved in the distal direction toward the surface 126 of the target 110, and detection element 122c can be moved in the proximal direction away from the surface 126 of the target 110. Therefore, pitch and roll of the stress sensor can be adjusted independently. In general, the roll can be adjusted, the raw stress signals can be measured, the attenuation element 260 can be moved distally and/or proximally to adjust the amount of attenuation, and the raw stress signals can be measured again. The process can be repeated until differences in the raw stress signals from the first pair of detection elements 122a, 122c and the second pair of detection elements 122b, 122d, as a function of attenuation, have been reduced as much as possible, or by a desired amount. Holding one axis fixed while rotating about another means that pitch and roll can be changed independently. This can decrease the time necessary to install and align the stress sensor.

Figure 3A:
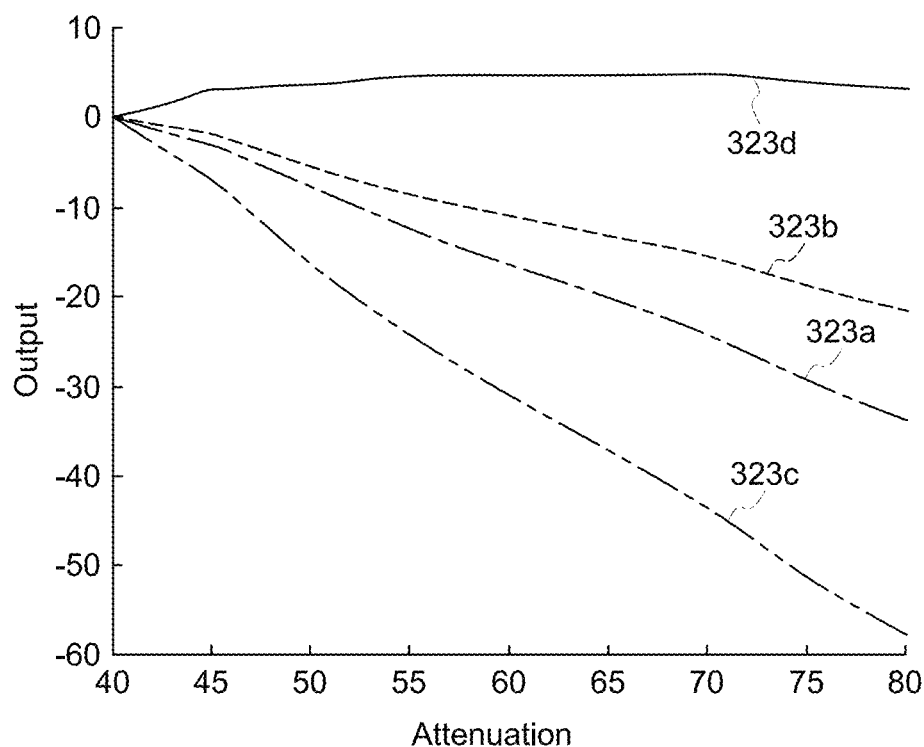
FIG. 3A is an exemplary plot of raw stress signals as a function of attenuation prior to an initial alignment of the sensor.

FIGS. 3A-3D show exemplary plots of raw stress signals output from the sensor assembly, as a function of magnetic flux attenuation, after various stages of sensor alignment. FIG. 3A shows the output of raw stress signals 323a, 323b, 323c, 323d from detection elements 122a, 122b, 122c, 122d, prior to an initial alignment of the sensor assembly. It can be observed that each of the raw stress signals 323a, 323b, 323c, 323d is substantially different from the others. This result indicates that each of the detection elements 122a, 122b, 122c, 122d is measuring a magnetic flux of different magnitude.

Figure 3B:
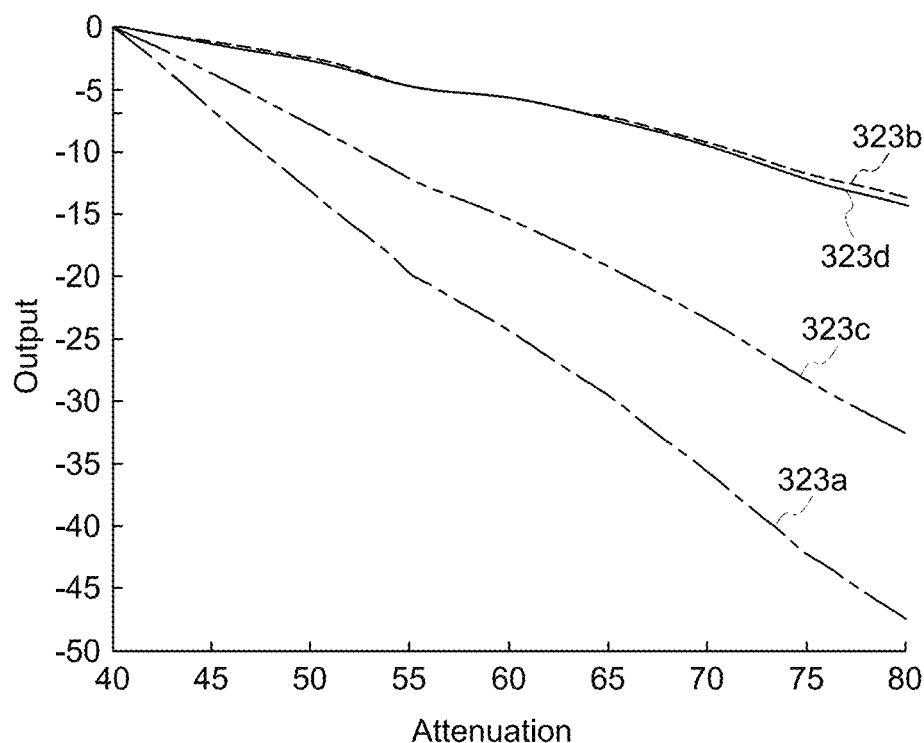
FIG. 3B is an exemplary plot of raw stress signals after an initial alignment of the sensor assembly.

FIG. 3B shows the output of raw stress signals 323a, 323b, 323c, 323d after the initial alignment of the sensor assembly using, e.g., a v-block. As shown in FIG. 3B, the raw stress signals 323b, 323d collapsed to become approximately equal. This result indicates that each of the detection elements, 122b, 122d is measuring a magnetic flux of approximately the same magnitude. As a result, a maximum difference in output of the raw stress signals 323a, 323b, 323c, 323d at a given attenuation decreases.

Figure 3C:
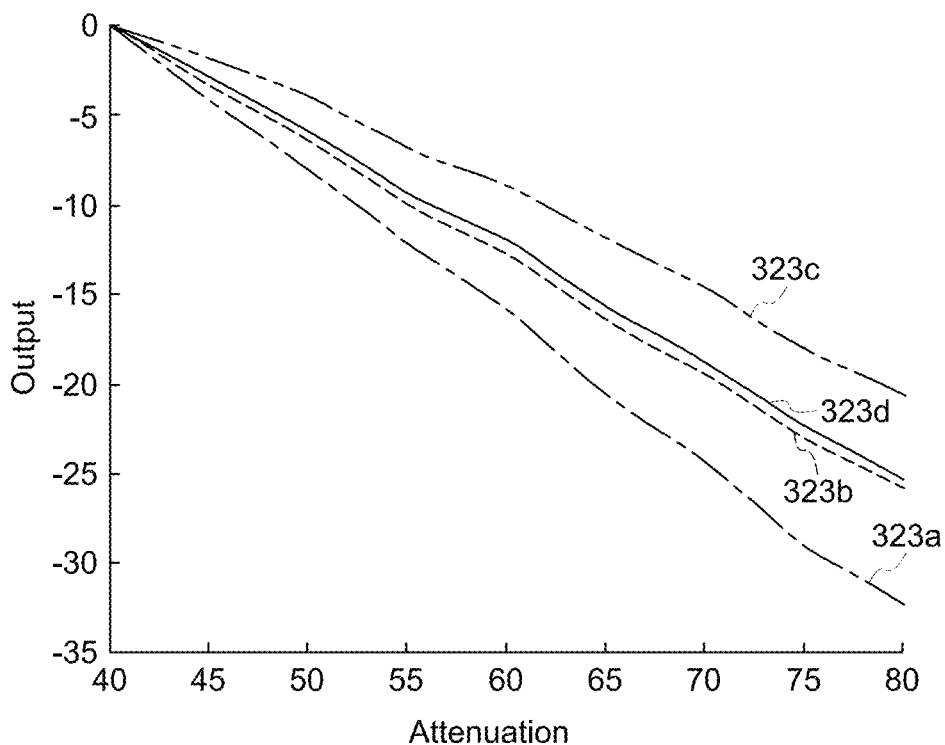
FIG. 3C is an exemplary plot of raw stress signals after a yaw of the sensor has been aligned.

FIG. 3C shows the output of raw stress signals 323a, 323b, 323c, 323d after the yaw of the sensor assembly has been adjusted. As shown in FIG. 3C, the maximum difference in output of the raw stress signals 323a, 323b, 323c, 323d at a given attenuation decreases further.

Figure 3D:
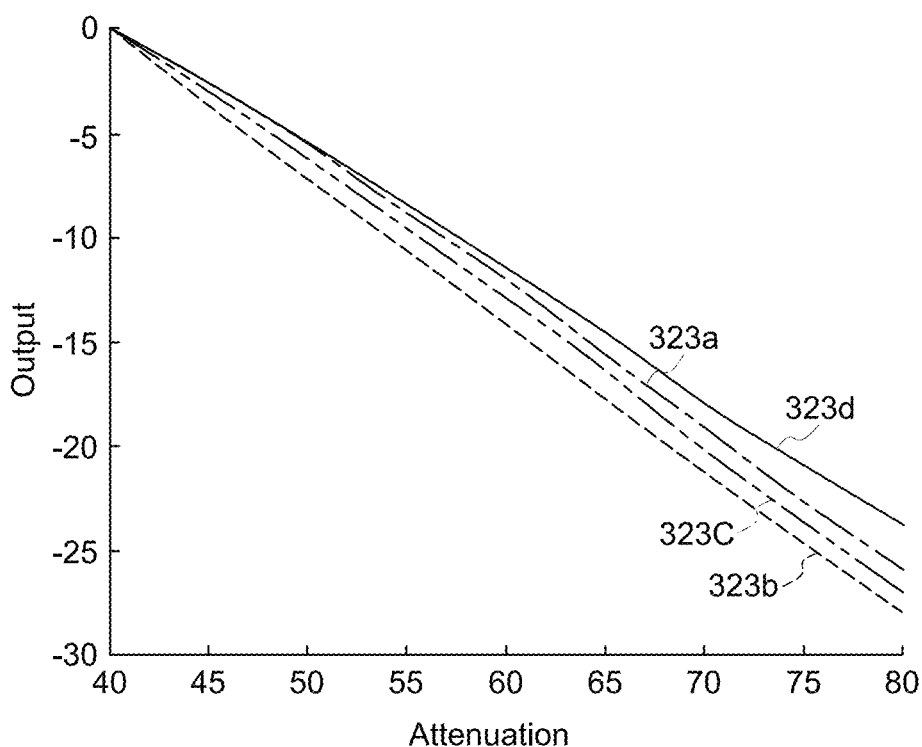
FIG. 3D is an exemplary plot of raw stress signals as a function of attenuation after a pitch and roll of the sensor have been aligned.

FIG. 3D shows the output of raw stress signals 323a, 323b, 323c, 323d after the pitch and roll of the sensor assembly have been adjusted. As shown in FIG. 3D, the pitch and roll adjustment can further decrease the maximum difference in output of the raw stress signals 323a, 323b, 323c, 323d at a given attenuation. Accordingly, the sensor assembly has been aligned such that changes in the attenuation of the magnetic flux result in approximately equal changes in raw stress signals output from the detection elements 122a, 122b, 122c, 122d. Since changes in attenuation vary proportionally to changes in the size of the gap between the sensor 202 and the target 110, the sensor has also been aligned such that changes in the size of the gap result in approximately equal changes in raw stress signals generated by the detection elements 122a, 122b, 122c, 122d.

As shown in FIGS. 3A-3D, the raw stress signals 323a, 323b, 323c, 323d can vary approximately linearly with attenuation. Therefore, a sensor assembly can be aligned using two or more values of attenuation. For example, the sensor 202 can be aligned using raw stress values that are measured when the attenuation element 260 is in the proximal-most position, shown in FIG. 2B, and when it is in the distal-most position, as shown in FIG. 2C.

Figure 4:
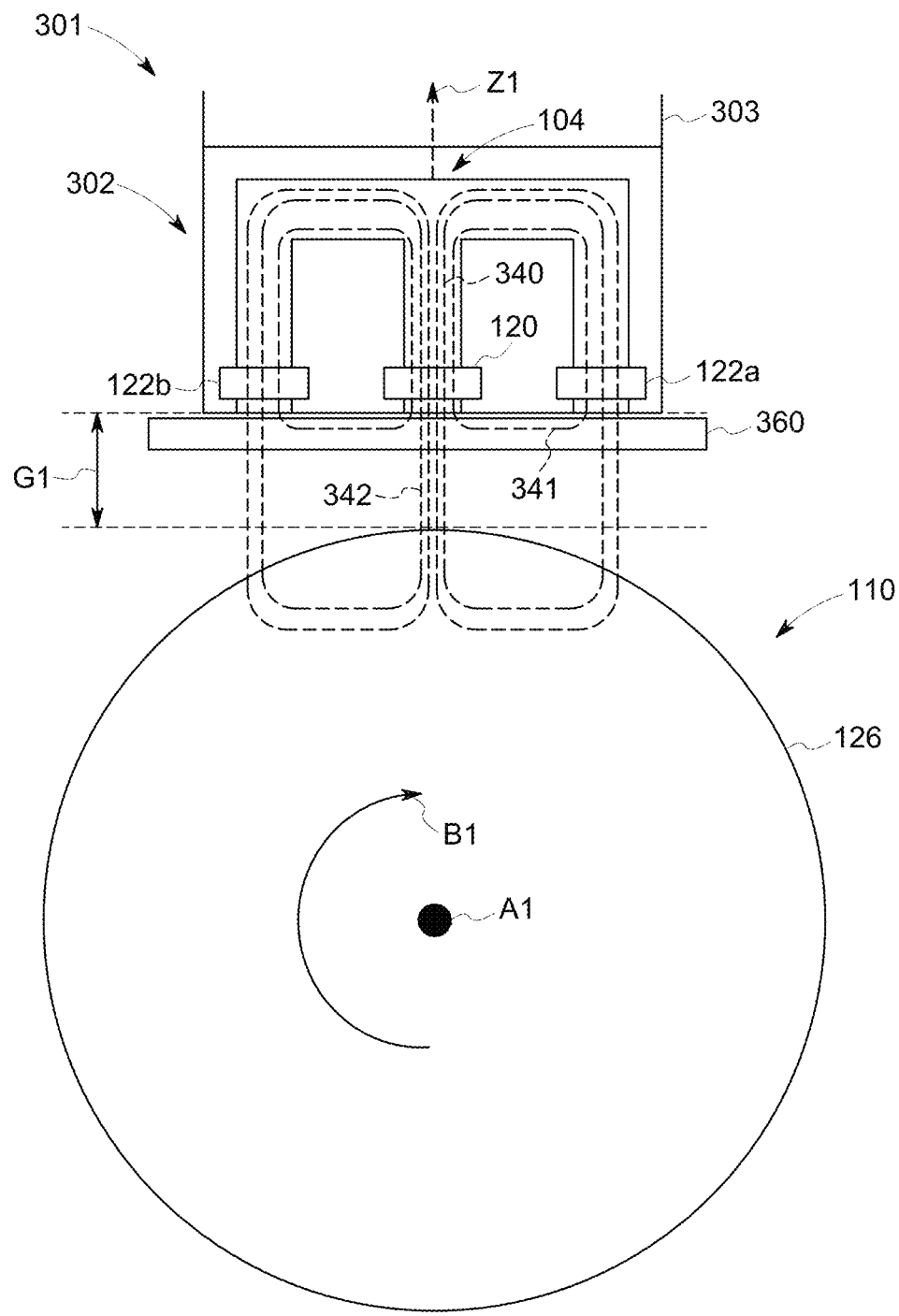
FIG. 4 is a side partial cross-sectional view of another exemplary embodiment of a sensor assembly that includes an attenuation element that is in the form of a plate.

In some embodiments, rather than using an attenuation element that is in the form of a cylindrical sleeve, the attenuation element can be in the form of a plate. FIG. 4 shows an embodiment of a sensor assembly 301 that can generally be similar to sensor assembly 201, but it can include an attenuation element 360 that is in the form of a plate. Therefore, the sensor assembly 301 can include a sensor 302 and the attenuation element 360. The sensor 302 can include the sensor head 104, shown in FIG. 1B, positioned within a housing 303. The attenuation element 360 can be positioned between a sensor 302 of the sensor assembly 301 and the target 110 such that it is fixed relative to the sensor 302.

Initially, the sensor 302 can be positioned within a bracket (e.g., bracket 150) and it can be mechanically aligned (e.g., using a V-block) to achieve an initial alignment between the sensor assembly 301 and the target 110. The drive element 120 can receive an input drive signal from a control and processing module, such as the control and processing module 106 shown in FIG. 1A, to generate a magnetic flux 340, corresponding to a magnetic field. The magnetic field can couple with the attenuation element 360 such that a first portion 341 of the magnetic flux 340 can travel through the attenuation element 360, and a second portion 342 can travel through the target 110. Accordingly, the attenuation element 360 can provide a flow path or preferential flow path for the first portion 341 of the magnetic flux 340, thereby reducing an amount of attenuation that would otherwise be observed if the first portion 341 of the magnetic flux traveled across the gap G1, and through the target 110. Both portions 341, 342 of the magnetic flux can be detected by the detection elements 122a, 122b, 122c, 122d. The attenuation element 360 can reduce an amount of attenuation that would otherwise be observed if the first portion 341 of the magnetic flux traveled across the gap G1, and through the target 110.

The alignment procedure can involve adjusting yaw, pitch, and roll of the sensor assembly 301 such that changes in the size of gap G1 between the sensor result in approximately equal changes in raw stress signals output from the detection elements 122a, 122b, 122c, 122d.

The yaw of the sensor assembly 201, and therefore the sensor head 104, can be adjusted such that differences in the raw stress signals from the first pair of detection elements 122a, 122c and the second pair of detection elements 122b, 122d, as a function of an amount of attenuation, can be reduced. In general, the yaw can be adjusted, the raw stress signals can be measured, the attenuation element 360 can be removed to adjust the amount of attenuation, and the raw stress signals can be measured again. The process can be repeated until differences in the raw stress signals from the first pair of detection elements 122a, 122c and the second pair of detection elements 122b, 122d, as a function of attenuation, have been reduced as much as possible, or by a desired amount. The pitch and roll of the sensor assembly 301 can be adjusted in a similar manner. In some cases, rather than removing the attenuation element 360, the position of the attenuation element 360 can be adjusted relative to the sensor 302 along the central axis Z1 of the sensor head 104 to adjust the amount of attenuation of the detected magnetic flux. Therefore, the attenuation element 360 can be configured to allow a detected portions 341, 342 of the magnetic flux 340 to be selectively adjusted without axially translating the sensor 302 relative to the target 110. For example, a magnitude of the portion 341 of the magnetic flux 340 can be adjusted depending on a position of the attenuation element 360 relative to the sensor 302.

Although the attenuation element 360 is shown as a flat plate, the attenuation element 360 can have any number of geometries. For example, it can be a curved plate, spheroid, ovoid, globate, globular, etc. In general, the attenuation element 360 can have any geometry that affects the detected magnetic flux of each detection element 122a, 122b, 122c, 122d approximately equally, for a given magnetic flux 340 from the drive element 120.

Stationary and Passive Attenuation Elements

Rather than aligning a sensor using an attenuation element that provides attenuation based on its position relative to the sensor, in other embodiments the sensor can be aligned using an attenuation element that can provide variable attenuation while remaining in a fixed position relative to the sensor. Such a configuration can simplify the alignment process by reducing the number of parts, for example moving parts, of a sensor assembly. As described above with regard to the sensor assemblies 201, 301, shown in FIGS. 2A-2C, and 4, the attenuation element can be configured to allow detected portions of a magnetic flux to be selectively adjusted without axially translating the sensor relative to a target.

Figure 5A:
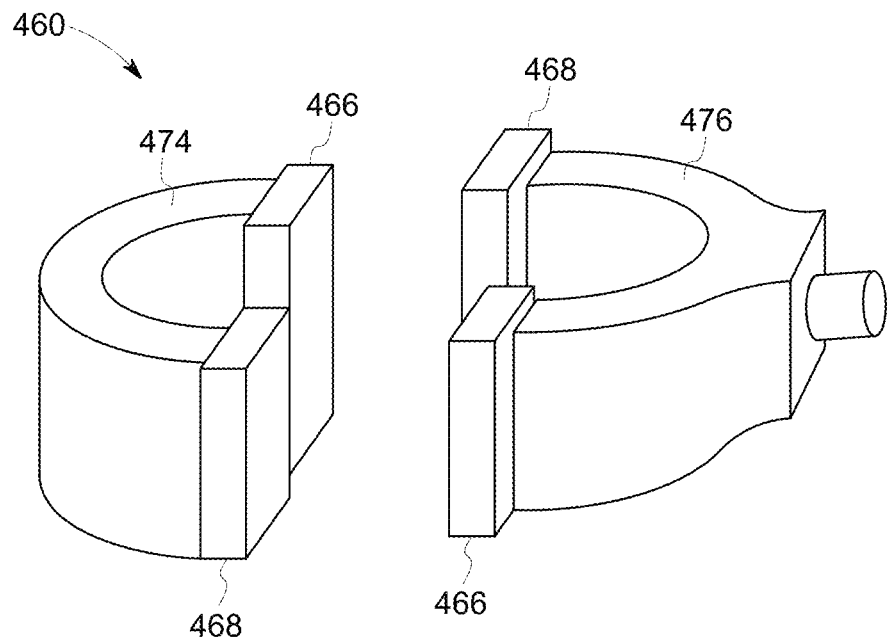
FIG. 5A is a perspective view of an exemplary embodiment of an attenuation element that can facilitate variable attenuation of a detected magnetic flux.
Figure 5B:
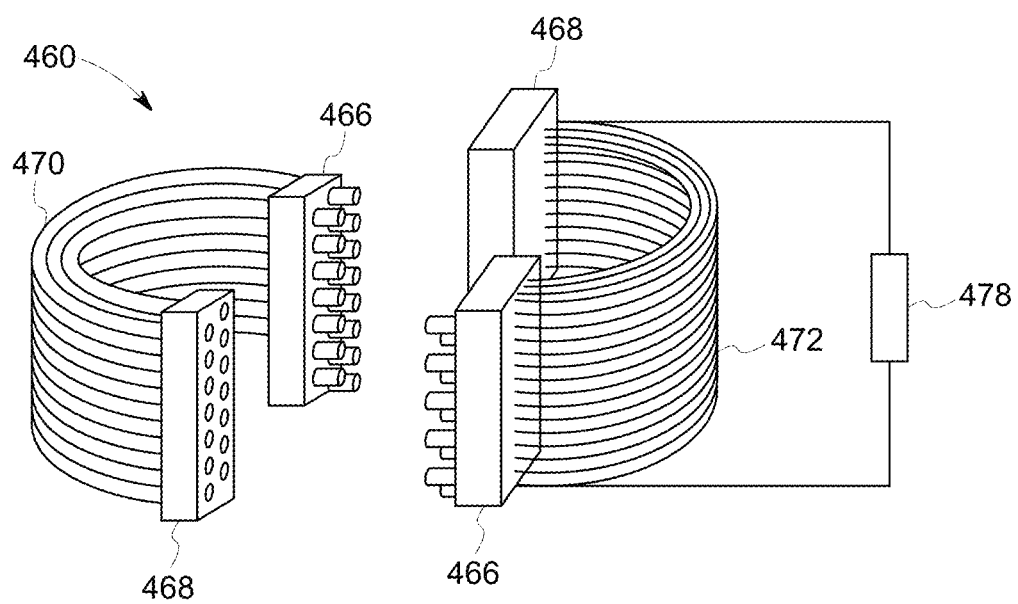
FIG. 5B is another perspective view of the attenuation element shown in FIG. 5A, with a housing of the attenuation element removed.

FIGS. 5A-5B show an attenuation element 460 that can provide variable attenuation while remaining fixed relative to a sensor. The attenuation element 460 can include a first part 462 and a second part 464 that can be coupled together using male and female mating elements 466, 468. The first and second parts 462, 464 can include conductive elements 470, 472 that can extend between the male and female mating elements 466, 468 within housings 474, 476 of the first and second parts 462, 464. The conductive elements 470, 472 can be made of an electrically conductive material such as, e.g., copper, or any other material suitable for the described purpose. When the first and second parts 462, 464 of the attenuation element 460 are mated, the conductive elements 470, 472 can be electrically coupled such that they form at least one conductive coil. As shown in FIG. 5B, the conductive coil can be coupled to a variable resistance resistor 478 in parallel. Accordingly, a resistance of a circuit formed by the conductive elements 470, 472 and the variable resistance resistor 478 can be selectively adjusted.

Figure 6:
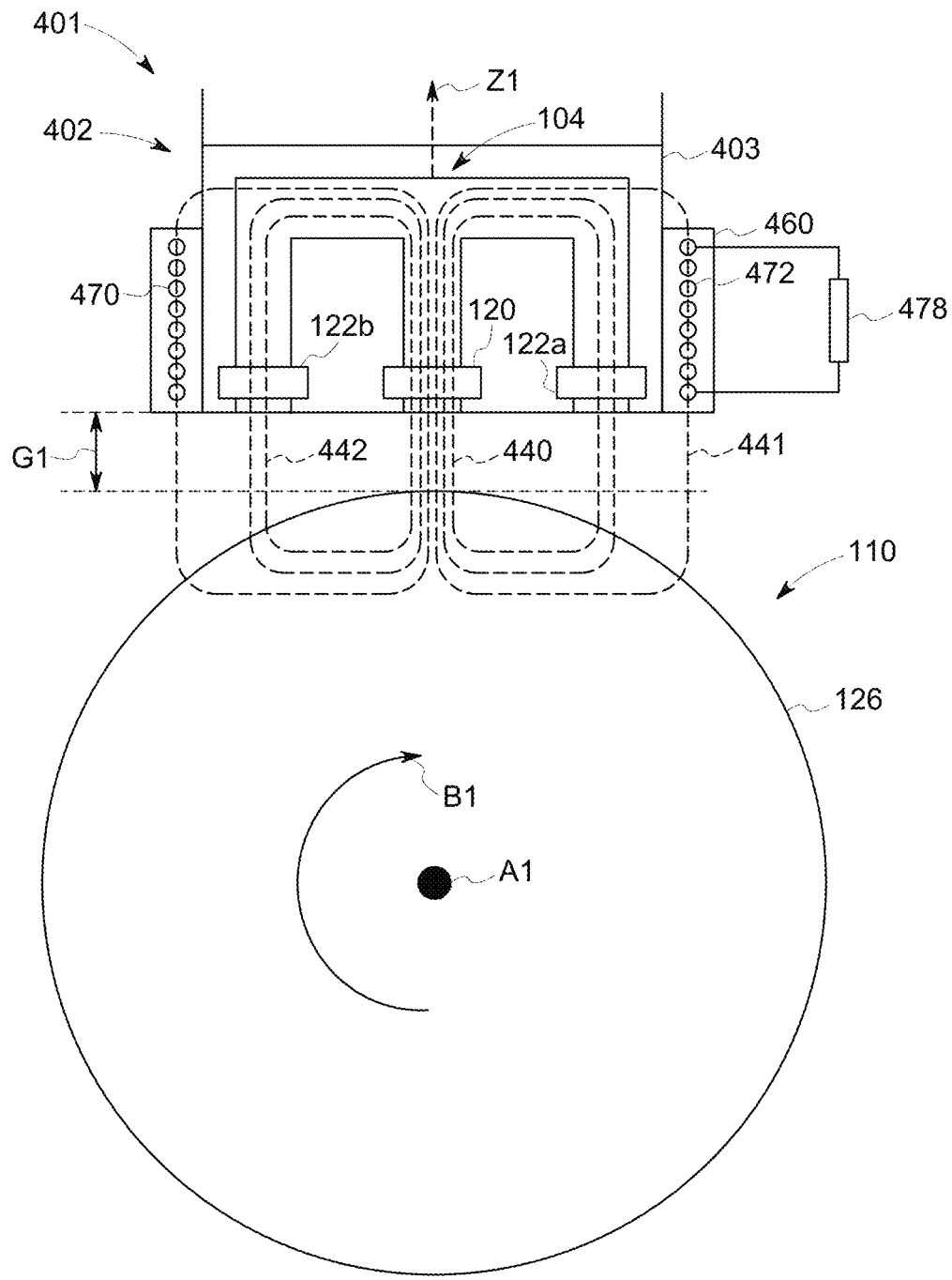
FIG. 6 is a side partial cross-sectional view of an exemplary embodiment of a sensor assembly that includes the attenuation element shown in FIGS. 5A-5B.

FIG. 6 shows an embodiment of a sensor assembly 401 that can include the attenuation element 460 and a sensor 402. The sensor 402 can generally be similar to sensor 202 and it can include the sensor head 104 positioned within a housing 403. The attenuation element 460 can be configured to selectively attenuate a magnetic flux detected by the sensor 402. As an example, the first and second parts 462, 464 of the attenuation element 460 can coupled to form the conductive coil, and the sensor 402 can be positioned within the attenuation element 460 such that the coil wraps around the sensor 402. In some embodiments, the variable resistance resistor 478 can be coupled to a control and processing module, such as control and processing module 106. The control and processing module can deliver signals to the variable resistance resistor 478 to adjust its resistance.

Initially, the sensor assembly 401 can be positioned within a bracket (e.g., bracket 150), and it can be mechanically aligned (e.g., using a V-block) to achieve an initial alignment between the sensor assembly 401 and the target 110. The drive element 120 can receive an input drive signal from the control and processing module to generate a first magnetic flux 440, corresponding to a first magnetic field. The input drive signal can be, e.g., an alternating current (AC) signal. The first magnetic flux 440 can travel from the drive element 120 through the target 110, and at least a portion of it can be detected by the detection elements 122*a*, 122*b*, 122*c*, 122*d*, which can generate raw stress signals based on the detected magnetic flux.

The first magnetic field can couple with the coil formed by the conductive elements 462, 464 such that a first portion 441 of the first magnetic flux 440 can travel through the attenuation element 460, and a second portion 462 can be detected by the detection elements 122*a*, 122*b*, 122*c*, 122*d*. Accordingly, the coupling can create a flow path or preferential flow path for the first portion 441 of the first magnetic flux 440, thereby reducing the amount of the first magnetic flux 440 detected by the detection elements 122*a*, 122*b*, 122*c*, 122*d*, and reducing the corresponding raw stress signals that can be generated. Furthermore, the coupling between the magnetic field and the coil of the attenuation element 460 can induce an alternating current that can flow through conductive elements 470, 472 and through the variable resistance resistor 478. The current flow through the coil can generate a second magnetic field, and corresponding second magnetic flux. The second magnetic field can have a phase shift of approximately 180° relative to the first magnetic field. Accordingly, the second magnetic field can attenuate the second portion 442 of the first magnetic flux 440 that is detected by the detection elements 122*a*, 122*b*, 122*c*, 122*d*

The amount of attenuation of the detected portion of the first magnetic flux 440 can be adjusted by varying the resistance of the variable resistance resistor 478. The amount of current flowing through conductive elements 470, 472 and through the variable resistance resistor 478 can vary inversely with changes in resistance of the variable resistance resistor 478. Therefore, reducing the resistance of the variable resistance resistor 478 can increase the amount of current flowing through the conductive elements 470, 472 and through the variable resistance resistor 478, thereby increasing the strength of the second magnetic field. Accordingly, the second magnetic field can have a greater attenuation effect on the detected portion of the first magnetic flux 440. Conversely, increasing the resistance of the variable resistance resistor 478 can decrease the magnitude of current flowing through the conductive elements 470, 472 and through the variable resistance resistor 478, thereby decreasing the strength of the second magnetic field. Therefore, the second magnetic field can have a lesser attenuation effect on the detected portion of the first magnetic flux 440.

The sensor assembly 401 can be aligned relative to the target 110 in a manner similar to that described above with regard to the sensor assemblies 201, 301. For example, the yaw of the sensor assembly 401 can be adjusted, the raw stress signals can be measured, resistance of the variable resistance resistor 478 can be adjusted to adjust the amount of attenuation, and the raw stress signals can be measured again. The process can be repeated until differences in the raw stress signals from the first pair of detection elements 122*a*, 122*c* and the second pair of detection elements 122*b*, 122*d*, as a function of attenuation, have been reduced as much as possible, or by a desired amount. The pitch and roll of the sensor assembly 301 can be adjusted in a similar manner.

Stationary and Active Attenuation Elements

In some embodiments, current flowing through the conductive elements 470, 472 can be actively controlled. For example, the coil formed by the conductive elements 470, 472 can be coupled to a control and processing module, such as control and processing module 106, such it can receive an input attenuation signal that can control current flow through the conductive elements 470, 472, thereby generating a second magnetic field. The input attenuation signal can be, e.g., an AC signal, having a given frequency, amplitude, and phase. By adjusting the frequency, amplitude, and/or phase, of the input attenuation signal, attenuation of the detected portion of the first magnetic flux 440 can be actively controlled. For example, the frequency and phase of the input attenuation signal can be configured such that the second magnetic field can attenuate the first magnetic field, thereby attenuating the detected portion of the first magnetic flux 440. The amplitude of the input attenuation signal can then be adjusted to vary the strength of the second magnetic field, thereby varying the amount of attenuation of the detected portion of the first magnetic flux. 440. For example, increasing the amplitude of the attenuation signal can increase the strength of the second magnetic field, thereby increasing attenuation of the second portion 442 of the first magnetic flux 440 that can be detected by the 122*a*, 122*b*, 122*c*, 122*d*. In another embodiment, the amplitude of the input attenuation signal can be decreased, thereby decreasing the strength of the second magnetic field, and reducing the amount of attenuation of the second portion 442 of the first magnetic flux 440.

Active control of the attenuation element 460 can also allow the detected portion of the first magnetic flux 440 to be amplified. For example, the phase of the input attenuation signal can be configured such that the phase of the resulting second magnetic field can be matched to the phase of the first magnetic field created by the drive element 120. Therefore, the second magnetic field can amplify the first magnetic field, thereby amplifying the detected portion of the first magnetic flux 440.

Figure 7:
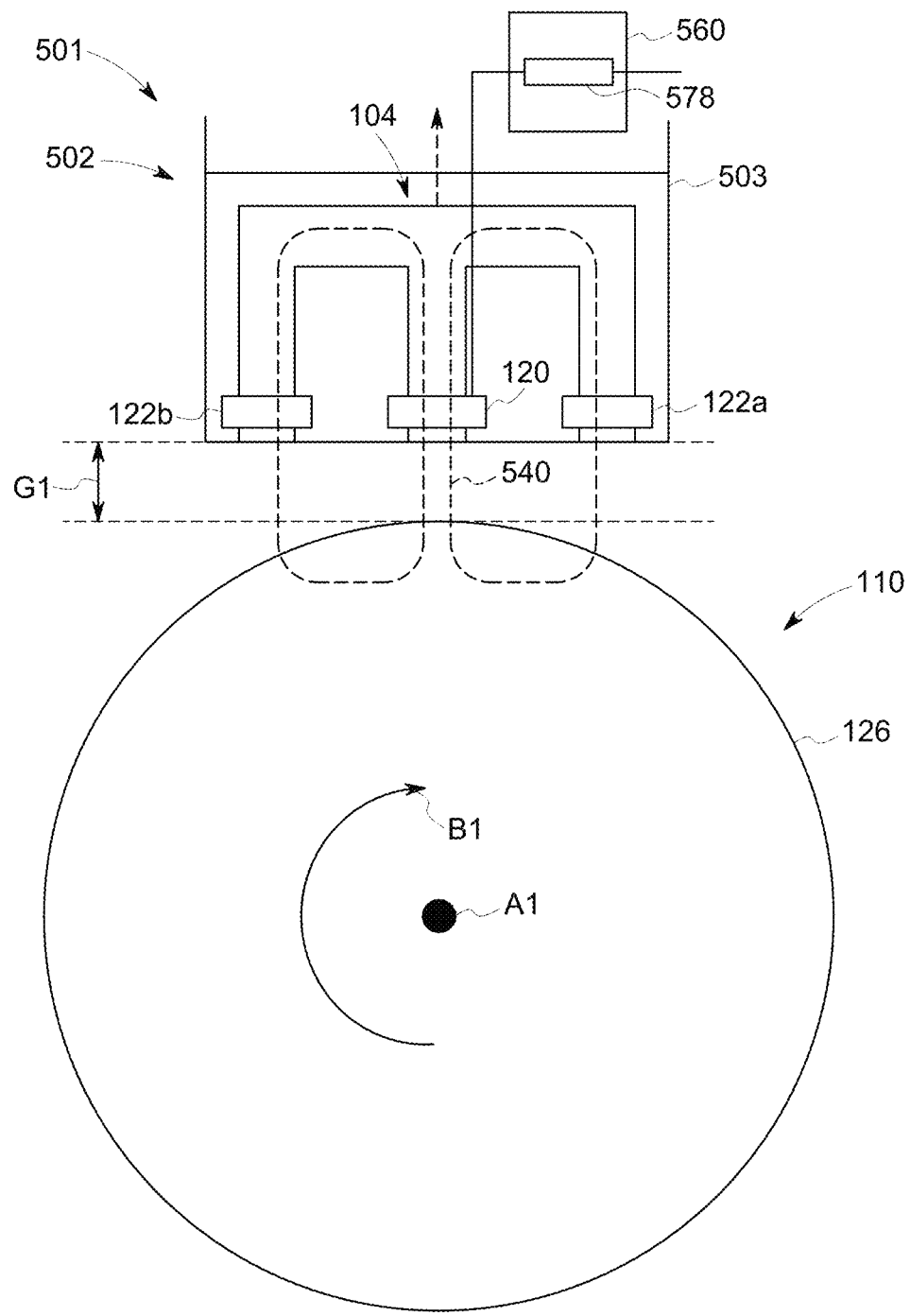
FIG. 7 is a side partial cross-sectional view of another exemplary embodiment of a sensor assembly that includes an attenuation element that can be used to selectively vary an input drive signal to a drive element.

In another embodiment, a detected portion of a magnetic flux can be attenuated by directly varying the strength of the magnetic flux. FIG. 7 illustrates an exemplary embodiment of a sensor assembly 501 that includes the attenuation element 560 that can be used to selectively vary an input drive signal, which can vary a strength of a resulting magnetic field. The sensor assembly 401 can include the attenuation element 560 and a sensor 502 that can generally be similar to sensor 202. The sensor 402 can include the sensor head 104 positioned within a housing 503.

The attenuation element 560 can include a variable resistance resistor 578 that can generally be similar to the variable resistance resistor 478. In some embodiments, the variable resistance resistor 578 can be coupled to a control and processing module, such as control and processing module 106. The control and processing module can deliver signals to the variable resistance resistor 578 to adjust its resistance.

Initially, the sensor 502 can be positioned within a bracket (e.g., bracket 150), and it can be mechanically aligned (e.g., using a V-block) to achieve an initial alignment between the sensor assembly 501 and the target 110.

The drive element 120 can receive an input drive signal from the control and processing module to generate a first magnetic flux 540, corresponding to a first magnetic field. The control and processing module can deliver a raw input drive signal to the variable resistance resistor 578 of the attenuation element 560, and the attenuation element 560 can deliver the input drive signal to the drive element 120. The input drive signal can be, e.g., an alternating current (AC) signal. The first magnetic flux 540 can travel from the drive element 120 through the target 110, and at least a portion of it can be detected by the detection elements 122a, 122b, 122c, 122d, which can generate raw stress signals based on the detected magnetic flux. The variable resistance resistor 578 of the attenuation element 560 can attenuate the raw input drive signal, thereby attenuating the magnetic flux 540 and the corresponding detected portion of the magnetic flux 540.

The sensor assembly 501 can be aligned relative to the target 110 in a manner similar to that described above with regard to the sensor assemblies 201, 301. For example, the yaw of the sensor 502 can be adjusted, the raw stress signals can be measured, resistance of the variable resistance resistor 578 can be adjusted to adjust the amount of attenuation, and the raw stress signals can be measured again. The process can be repeated until differences in the raw stress signals from the first pair of detection elements 122a, 122c and the second pair of detection elements 122b, 122d, as a function of attenuation, have been reduced as much as possible, or by a desired amount. The pitch and roll of the sensor 502 can be adjusted in a similar manner.

As described above, sensor alignment can compensate for manufacturing inconsistencies that can result in varied values of magnetic flux being detected by detection elements of the sensor, as well correcting user variability in placement of the sensor relative to a target. One example of a manufacturing inconsistency can be slight variations in placement of the detection elements 122a, 122b, 122c, 122d on the detection arms 116a, 116b, 116c, 116d. Variations in the placement of the detection elements 122a, 122b, 122c, 122d can result in varied values of detected magnetic flux. In certain situations, where manufacturing inconsistencies have been mitigated, sensor alignment can primarily correct user variability in placement of the sensor relative to the target. Accordingly, a correct position of the sensor relative to the target can be known prior to alignment. Therefore, a sensor can simply provide a user with information detailing how the sensor can be adjusted relative to the target to achieve the correct sensor alignment.

Figure 8:
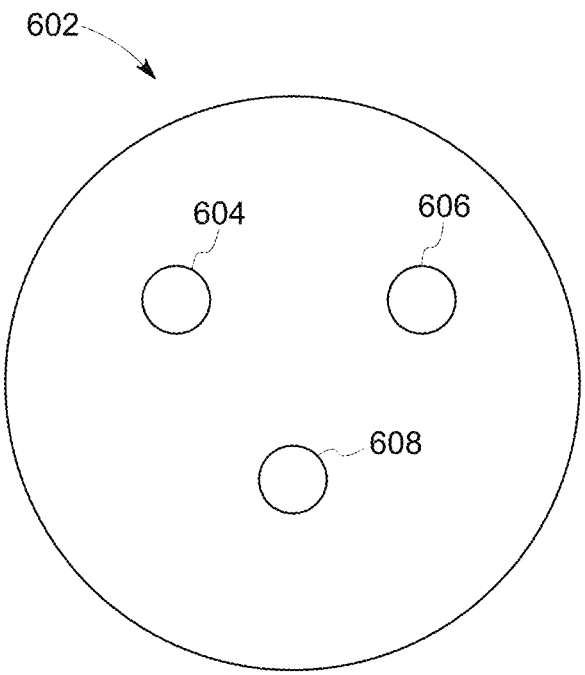
FIG. 8 is a top view of an exemplary embodiment of a sensor that includes indicators that provide information regarding the alignment of the sensor relative to a target.

FIG. 8 shows a top view of a sensor 602 similar to sensor 202 that can also include yaw, pitch, and roll indicators 604, 606, 608. The pitch and roll indicators 604, 606, 608 can be configured to provide information regarding the placement of the sensor 602 relative to a target 110. As an example, in a manner similar to that described above with regard to sensor assemblies 201, 301, 401, 501, a drive element of the sensor 602 can receive an input drive signal from a control and processing module and it can generate a magnetic flux that can travel through the target 110 and be detected by detection elements. The detection elements can generate raw stress signals corresponding to the detected magnetic flux, and the raw stress signals can be delivered to the control and processing module. The control and processing module can use the raw stress signals to determine the current orientation of the sensor 602 relative to a correctly aligned orientation of the sensor 602, and can deliver yaw, pitch, and roll signals to the indicators 604, 606, 608. In some embodiments, the indicators can be LED indicators that can light up with varying brightness to inform a user of how to adjust the sensor 602. For example, the light from indicators 604, 606, 608 can individually increase in intensity as yaw, pitch, and/or roll are adjusted closer to a desired value. Conversely, the indicators 604, 606, 608 can dim if yaw, pitch, and/or roll are adjusted away from the desired value. In some embodiments, the LED indicators 604, 606, 608 can blink with light to inform the user of how to adjust the sensor 602. For example, the indicators 604, 606, 608 can blink with increasing frequency as yaw, pitch, and/or roll are adjusted closer to a desired value. Alternatively, the indicators 604, 606, 608 can blink with decreasing frequency as yaw, pitch, and/or roll are adjusted closer to a desired value.

In some embodiments, the indicators 604, 606, 608 can change colors to inform the user of how to adjust the sensor 602. For example, the indicators 604, 606, 608 can individually transition from red to green as yaw, pitch, and/or roll are adjusted toward the desired value. Conversely, the indicators can individually transition from green to red if yaw, pitch, and/or roll are adjusted away from the desired value.

Figure 9:
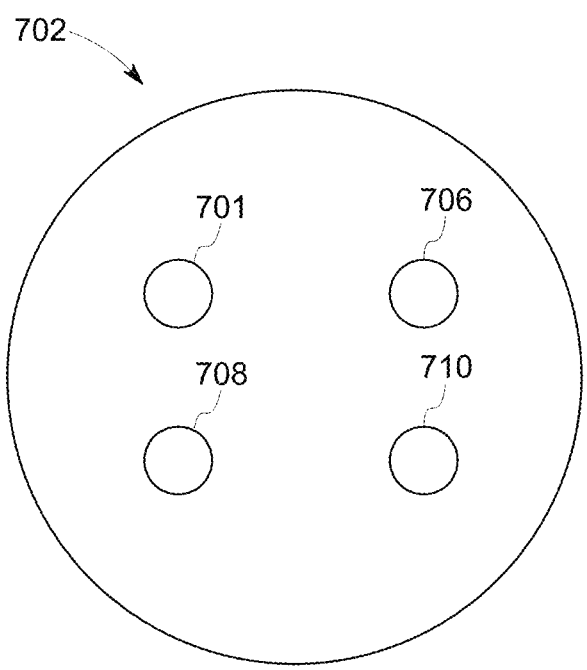
FIG. 9 is a top view of another exemplary embodiment of a sensor that includes indicators that provide information regarding the alignment of the sensor relative to a target.

FIG. 9 shows a top view of another embodiment of a sensor 702 that can provide information regarding the placement of the sensor 702 relative to a target. The sensor 702 can generally be similar to the sensor 602 shown in FIG. 8, but can include indicators 704, 706, 708, 710, that can correspond to detection elements such as the detection elements 122a, 122b, 122c, 122d shown in FIG. 1B. In a manner similar to that described above with regard to sensor assemblies 201, 301, 401, 501, a drive element of the sensor 702 receive an input drive signal from a control and processing module and can generate a magnetic flux that can travel through the target and be detected by the detection elements. The detection elements can generate raw stress signals corresponding to the detected magnetic flux, and the raw stress signals can be delivered to the control and processing module. The control and processing module use the raw stress signals to determine the current orientation of the sensor relative to a correctly aligned orientation of the sensor, and can deliver signals corresponding to each detection element to the indicators 704, 706, 708, 710. In some embodiments, the indicators can be LED indicators that can light up with varying brightness to inform a user of how to adjust the sensor 704. For example, the light from indicators 704, 706, 708, 710 can individually increase in intensity as the detection elements are adjusted closer to a desired position. Conversely, the indicators 704, 706, 708, 710 can dim if the detection elements are adjusted away from the desired position.

Exemplary technical effects of the methods, systems, and devices described herein include, by way of non-limiting example, the ability to align a stress sensor relative to a target while maintaining a constant gap size between the sensor and the target. The ability to align a stress sensor without varying the size of the gap between the sensor and the target can drastically the time required to install the sensor, and improve accuracy of the sensor by reducing movement of the sensor during alignment.

Other embodiments are within the scope and spirit of the disclosed subject matter.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A sensor assembly, comprising:
a sensor including
a drive element configured to generate a first magnetic field and a corresponding first magnetic flux that travels through a first gap distance between the drive element and a surface of a target and through the target, and
at least one detection element configured to detect a portion of the first magnetic flux;
a housing containing the drive element and the at least one detection element; and
an attenuation element configured for placement circumferentially about at least a portion of an outer surface of the housing and configured to allow the detected portion of the first magnetic flux to be selectively adjusted without axially translating the sensor relative to the target.

2. The sensor assembly of claim 1, wherein a position of the attenuation element is adjustable relative to the sensor such that varying the position of the of the attenuation element varies the detected portion of the first magnetic flux.

3. The sensor assembly of claim 1, wherein the attenuation element comprises a sleeve disposed about the sensor, the attenuation element being configured to increase an amount of attenuation as it is moved toward the target.

4. The sensor assembly of claim 1, wherein the attenuation element is disposed about at least a portion of the sensor, the attenuation element including at least one conductive element that is configured to generate a second magnetic field that interacts with a portion of the first magnetic field, thereby adjusting a magnitude of the detected portion of the first magnetic flux, the second magnetic field being generated by an alternating current that flows through the at least one conductive element and being configured to attenuate a portion of the first magnetic field, thereby attenuating the detected portion of the first magnetic flux.

5. The sensor assembly of claim 4, wherein the at least one conductive element of the attenuation element is configured to couple with the first magnetic field.

6. The sensor assembly of claim 5, further comprising a resistor coupled in parallel with the conductive element, wherein a resistance of the resistor is variable such that adjusting the resistance of the resistor adjusts a magnitude of the second magnetic field, thereby adjusting the magnitude of the detected portion of the first magnetic flux.

7. The sensor assembly of claim 6, wherein the attenuation element is configured to increasingly attenuate the detected portion of the first magnetic flux as resistance of the resistor is decreased.

8. The sensor assembly of claim 4, wherein the at least one conductive element of the attenuation element is configured to receive a selectively adjustable alternating current attenuation signal to generate the alternating current that flows through the at least one conductive element.

9. The sensor assembly of claim 8, wherein the attenuation element is configured to attenuate the detected portion of the first magnetic flux when a phase of the second magnetic field is out of phase with a phase of the first magnetic field.

10. The sensor assembly of claim 8, wherein the attenuation element is configured to amplify the detected portion of the first magnetic flux when a phase of the second magnetic field is in phase with a phase of the first magnetic field.

11. The sensor assembly of claim 1, further comprising at least one LED indicator configured to output a signal regarding an alignment of the sensor relative to a desired alignment of the sensor.

12. The sensor assembly of claim 11, wherein the at least one LED indicator comprises first, second and third LED indicators corresponding to yaw, pitch, and roll values of a position of the sensor.

13. The sensor assembly of claim 12, wherein the first, second, and third LED indicators are configured to output light that changes in brightness as yaw, pitch, and roll are adjusted toward a desired values.

14. The sensor assembly of claim 12, wherein the first second and third LED indicators are configured to output light that changes in color as yaw, pitch, and roll are adjusted toward desired values.

15. The sensor assembly of claim 12, wherein the first, second, and third LED indicators are configured to blink with varying frequency as yaw, pitch, and roll are adjusted toward desired values.

16. A sensor assembly, comprising:
a sensor including,
a drive element configured receive an input drive signal and, in response, to generate a first magnetic field and a corresponding first magnetic flux that travels through a first gap distance between the drive element and a surface of a target and through the target, and
at least one detection element configured to detect a portion of the first magnetic flux; and
an attenuation element configured to allow the detected portion of the first magnetic flux to be selectively adjusted without axially translating the sensor relative to the target;
wherein the attenuation element is configured to receive a raw input drive signal and use the raw input drive signal to generate the input drive signal that is received by the drive element.

17. The sensor assembly of claim 16, wherein the attenuation element includes a resistor, the resistor being configured to control a magnitude of the input drive signal, thereby controlling a magnitude of the first magnetic flux, wherein a resistance of the resistor is configured to be adjustable such that increasing the resistance of the resistor decreases the magnitude of the input drive signal, thereby decreasing the magnitude of the first magnetic flux and decreasing a magnitude of the detected portion of the first magnetic flux.

18. A method of aligning a sensor assembly, comprising:
activating a control and processing module to deliver an input drive signal to a drive element of a sensor of a sensor assembly, thereby generating a first magnetic field having a corresponding first magnetic flux that travels through a target, wherein at least one detection element detects a portion of the first magnetic flux;
adjusting the detected portion of the first magnetic flux by an attenuation element configured for placement circumferentially about at least a portion of an outer surface of a housing, the housing containing the drive element and the at least one detection element; and
rotating the sensor about at least one of a first axis to adjust a yaw of the sensor relative the target, a second axis to adjust a pitch of the sensor, and a third axis to adjust a roll of the sensor.

19. The method of claim 18, further comprising adjusting a position of the attenuation element to attenuate the detected portion of the first magnetic flux, wherein moving the attenuation element toward the target increases the attenuation of the detected portion of the magnetic flux.

20. The method of claim of claim 18, further comprising coupling the first magnetic field with a conductive element of the attenuation element, thereby inducing an alternating current that flows through the conductive element such that the conductive element generates a second magnetic field, wherein the second magnetic field attenuates the first magnetic field, thereby adjusting the detected portion of the first magnetic flux by attenuating the detected portion of the first magnetic flux.

21. The method of claim 20, further comprising adjusting a resistance of a resistor coupled to the conductive element to adjust an amount of attenuation of the detected portion of the first magnetic flux.

22. The method of claim 18, further comprising delivering a selectively adjustable alternating current attenuation signal to a conductive element of the attenuation element, thereby generating an alternating current that flows through the conductive element such that the conductive element generates a second magnetic field,
wherein an amplitude, phase, and frequency of the selectively adjustable alternating current attenuation signal define an amplitude, phase, and frequency of second magnetic field.

23. The method of claim 22, further comprising adjusting the amplitude of the alternating current attenuation signal, thereby adjusting the amplitude of the second magnetic field.

24. The method of claim 22, wherein the detected portion of the first magnetic flux is adjusted by attenuating the detected portion of the first magnetic flux when the phase of the second magnetic field is out of phase with a phase of the first magnetic field.

25. The method of claim 18, wherein the yaw, pitch, and roll of the sensor are adjusted based on an output from at least one LED indicator on the sensor assembly.

26. The method of claim 25, wherein the output is a light intensity from the at least one LED indicator.

27. The method of claim 25, wherein the output is a color of light from the at least one LED indicator.

28. The method of claim 25, wherein the output is a blinking frequency of light from the at least one LED indicator.

* * * * *